United States Patent [19]
Stickney

[11] 3,932,136
[45] Jan. 13, 1976

[54] INTEGRATED FLOW PATH BLOCK

[75] Inventor: Michael E. Stickney, Burlingame, Calif.

[73] Assignee: Durrum Instrument Corporation, Palo Alto, Calif.

[22] Filed: June 1, 1973

[21] Appl. No.: 365,970

[52] U.S. Cl................ 23/259; 23/253 R; 141/105; 141/107; 222/145; 259/4
[51] Int. Cl.²............... B01F 15/00; B67D 5/00; G01N 21/00; G01N 27/00
[58] Field of Search........... 23/253 R, 259; 141/105, 141/107; 222/137, 145, 335; 259/4, 18

[56] References Cited
UNITED STATES PATENTS

| | | | |
|---|---|---|---|
| 3,390,814 | 7/1968 | Creighton | 222/145 |
| 3,572,130 | 3/1971 | Goldsmith | 23/259 X |
| 3,615,241 | 10/1971 | Low | 23/259 |

OTHER PUBLICATIONS

High Resolution Mixer for the Study of the Kinetics of Rapid Reactions in Solution, R. L. Berger et al., The Rev. of Scientific Instruments, Vol. 39, No. 4, pp. 493–498.

High Speed Optical Stopped–Flow Apparatus, R. L. Berger et al., The Rev. of Scientific Instruments, Vol. 39, No. 4, pp. 486–492.

*Primary Examiner*—Morris O. Wolk
*Assistant Examiner*—Michael S. Marcus
*Attorney, Agent, or Firm*—Flehr, Hohbach, Test, Albritton & Herbert

[57] ABSTRACT

A flow path block having capability for storing a plurality of reactant volumes and for delivering the reactants through separate paths to a common mixing chamber where the reactants are mixed and delivered through reactant outlet means. Reactant outlet means may include a measurement chamber for determining the stopped flow kinetics of reactions in the mixture or may be a path for delivery of the mixed reactants to an external vessel for some subsequent intended use.

11 Claims, 10 Drawing Figures

INTEGRATED FLOW PATH BLOCK

BACKGROUND OF THE INVENTION

This invention relates to an integrated flow path block for storage, delivery, and mixing of a plurality of reactants, and more particularly to such a flow path block having a measurement chamber for determination of stopped flow reaction rates in the mixture.

The mixing of a plurality of reactants rapidly and thoroughly is often desirable. The mixed reactants may be utilized as one ingredient in a subsequent mixture where a precisely measured amount of the mixture is required and/or where addition of the reactants singley into the subsequent mixture is undesirable. Rapid and complete mixture of a number of reactants is required when the purpose is to measure reaction rates within the mixture. One such technique commonly used to measure reaction rates is called stopped flow spectrophotometry. In this technique the measurement of optical absorption versus time is the basis for rate determination. Alternate means of measurement such as fluorescence, electrical conductivity, etc., may be used.

When engaged in the study of the kinetics of chemical reactions in a solution the capability for mixing all of the reactants rapidly is of primary importance. This capability sets a lower limit on the time interval for the solution to travel from the point where mixing begins to the point of measurement. This is a determining factor in the resolution of the measurement system. This time interval is defined as the dead time of the mixer, and extends from the time when initial contact is made between the plurality of reactants to the point in time at which first measurements may be made.

Normally a precise flow volume or stopped flow measurement device requires positive flow stopping means. Generally a drain valve is necessary in conjunction with the positive flow stopping means. Input valving is also a general requirement as the reactants are transferred from reservoirs storing the reactants to drive syringes preparatory to causing flow to the mixer from the drive syringes. An apparent need exists for an integrated flow path block for containing amounts of the reactants, delivering the reactants to a mixer, mixing the reactants thoroughly and rapidly, and delivering them to a means for subsequent use which may be a means for measuring reaction rates in the mixed solution.

SUMMARY AND OBJECTS OF THE INVENTION

In general the disclosed invention provides a flow path block integrating the containers for holding the various reactants to be mixed, the inlet paths from each container, a mixer in communication with all of the inlet paths for rapid and thorough mixing of the reactants, and an outlet means for delivering the mixed reactants for their ultimate purpose. The reactant outlet means may include means for measuring the kinetics of reaction rates in the mixed solution of reactants. The measuring means may be an optical path for measurement of light energy transmission characteristics, an electrical path for measurement of electrical conductance characteristics, or any other type of path for extraction of a characteristic of the reactant mixture indicative of the kinetics of reaction rates within the mixed solution.

In general it is an object of the present invention to provide an integrated flow path block incorporating reactant containers, a mixer for the reactants, measurement means for determining a physical characteristic of the mixed reactants, and the necessary communications therebetween to provide the desired flow sequence.

Another object of the invention is to provide an integrated flow path block of the above character having receptacles for drive syringe bodies containing the reactants.

Another object of the invention is to provide an integrated flow path block of the above character providing rapid and thorough mixing of the reactants internally.

Another object of the present invention is to provide an integrated flow path block of the above character having an optical path for measuring light absorbence in the mixture of reactants.

Another object of the invention is to provide an integrated flow path block of the above character having a light seal on the two faces of the block in communication with the optical path.

Another object of the invention is to provide an integrated flow path block of the above character which does not require positive flow stopping means.

Another object of the invention is to provide an integrated flow path block of the above character which does not require valves for direction of the reactant or mixture flow.

Another object of the invention is to provide an integrated flow path block providing a precisely measured amount of thoroughly mixed reactants for subsequent use externally of the block.

Additional objects and features of the invention will appear from the following description in which the preferred embodiments have been set forth in detail in conjunction with the accompanying drawings.

BRIEF DESCRIPTION OF THE PREFERRED EMBODIMENTS

Figure 1:
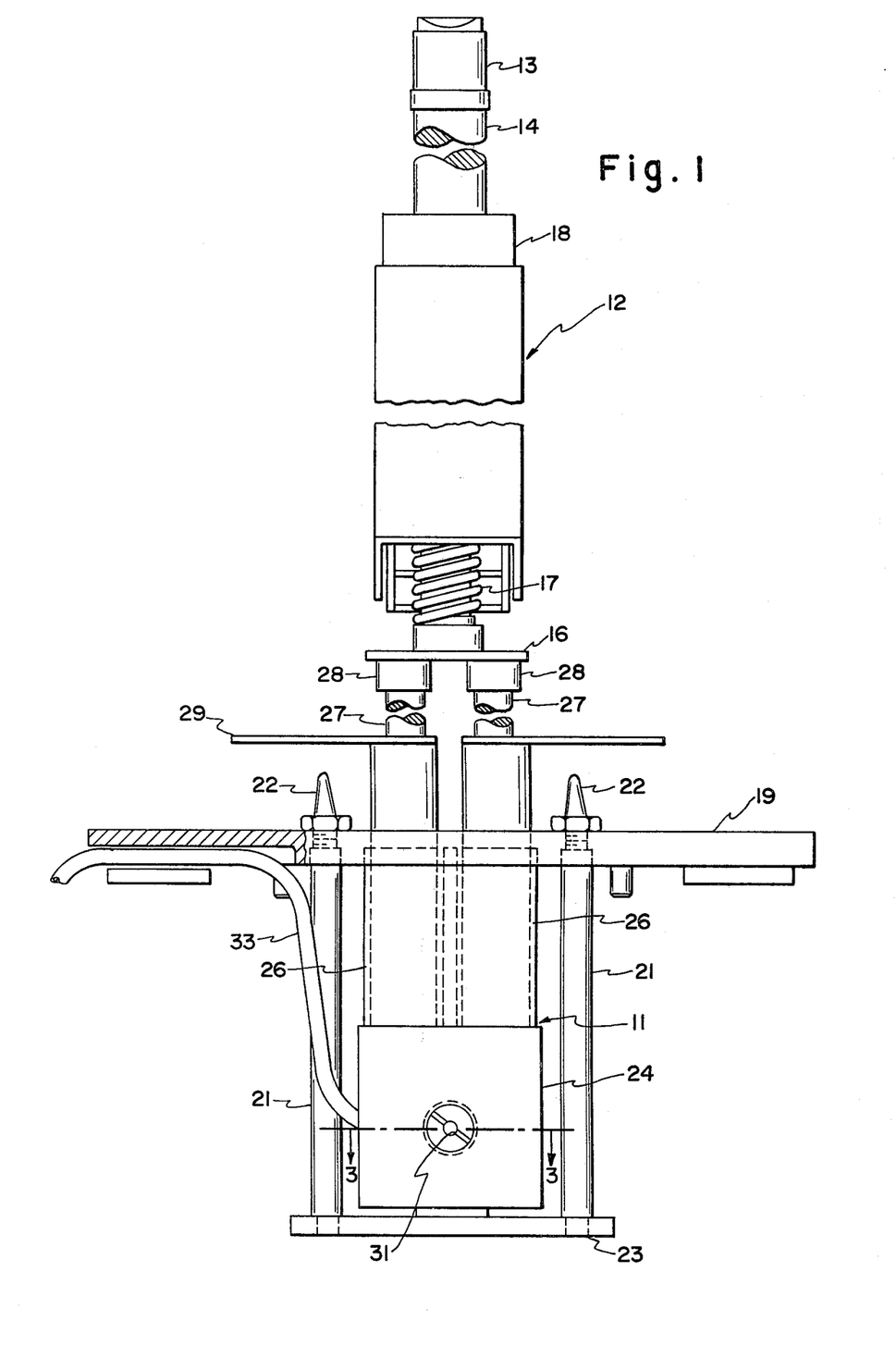
FIG. 1 is a front elevation view of an assembly utilizing one embodiment of the integrated flow path block.

The integrated flow path block mixes a plurality of contained reactants rapidly and thoroughly, directing the mixture of reactants through an outlet means leading from the mixer. In one embodiment the outlet means including means for measuring physical characteristics of the mixed reactants. Referring to FIG. 1 this embodiment of an integrated flow path block 11 is shown in association with a spring syringe drive mechanism 12. The spring syringe drive 12 is disclosed in copending patent Application Ser. No. 365,969 filed June 1, 1973 concurrently with this application. Spring syringe drive mechanism 12 includes a triggering knob 13 supported atop a support rod 14 for actuating the mechanism and driving the ram 16 through a predetermined distance with a predetermined force derived from drive spring 17. A housing 18 encloses spring syringe 12 and it is generally supported on base 19. Keeper rods 21 extend below base 19, attached thereto by nuts 22, and supporting a keeper 23 at their lower ends.

A block body 24 is attached to keeper 23 and, in this embodiment, contains a pair of syringe barrels 26 each having a syringe piston 27 inserted therein having upper portions 28 in contact with ram 16. Syringe barrels 26 have handling flanges 29 extending outwardly from their upper ends.

An optical path 31 is shown centrally disposed in the face 32 of block body 24 and an efflux tube 33 is shown for conducting reactant efflux from the block body 24.

Figure 2:
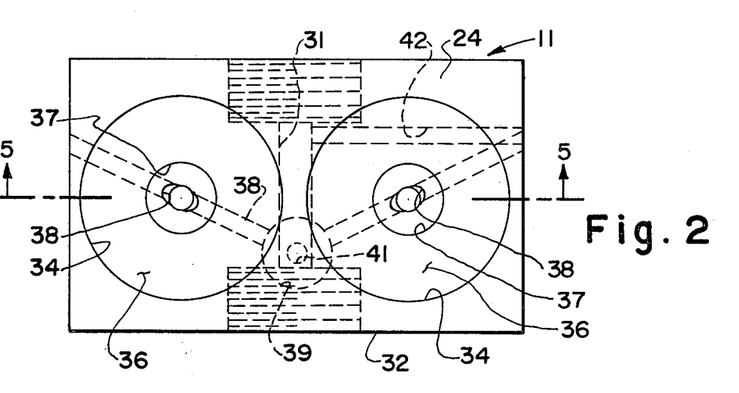
FIG. 2 is a plan view of the integrated flow path block shown in FIG. 1.
Figure 5:
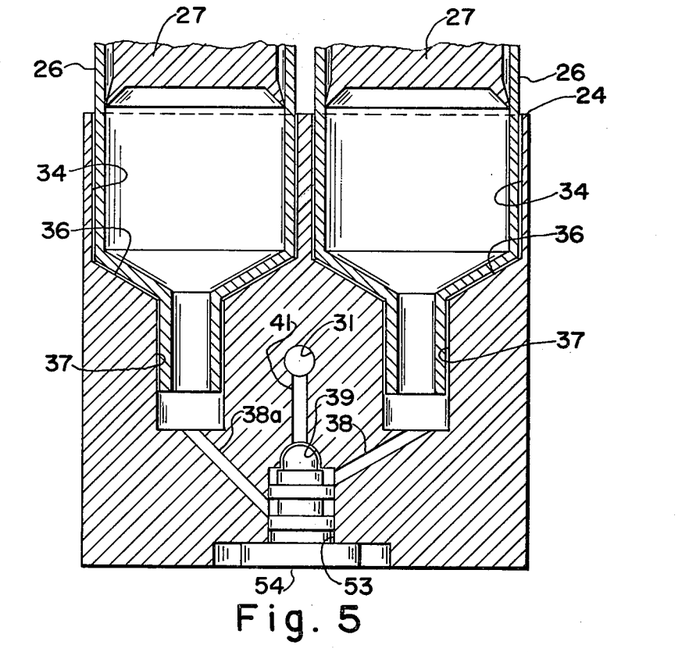
FIG. 5 is a sectional view along the line 5—5 of FIG. 2 showing an integral flow path block using a complex mixer.
Figure 5A:
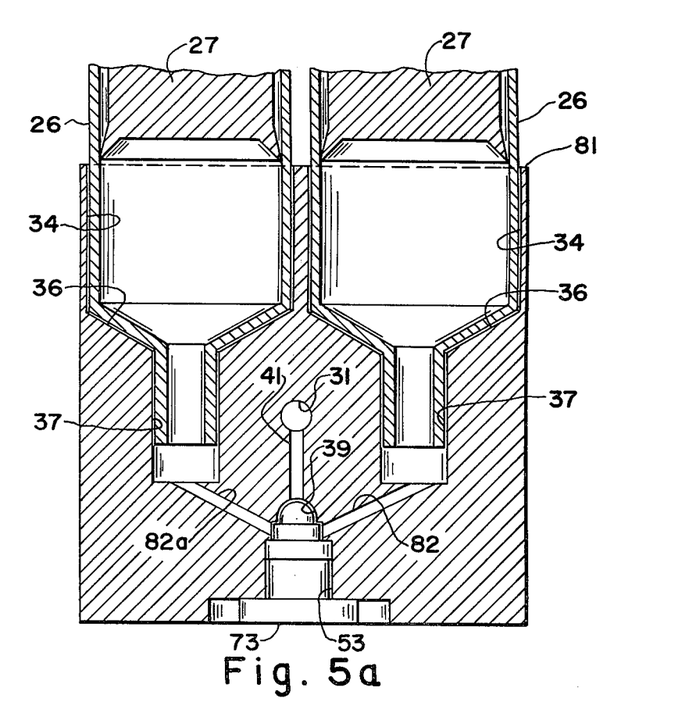
FIG. 5a is another sectional view along the line 5—5 of FIG. 2 showing an integral flow path block using a simple mixer.

Turning now to FIG. 2 the embodiment having a block body 24 for receiving syringe barrels 26 as in FIG. 1 is shown. Cavities 34 are formed in one side of block 24 having a conical bottom or countersink 36 as best seen in FIGS. 5 and 5a matching the conical surface at the bottom of the syringe barrel 26. A smaller bore 37 having a standard Luer taper extends from the bottom of the countersink 36 and communicates with an inlet path 38. A plurality of inlet paths 38 extend through the block body 24 to a mixing chamber 39 which is in communication with a passage 41 extending through the block 24 to the optical path 31. An efflux passage 42 extends from the downstream end of optical path 31 to the exterior of block 24.

Figure 3:
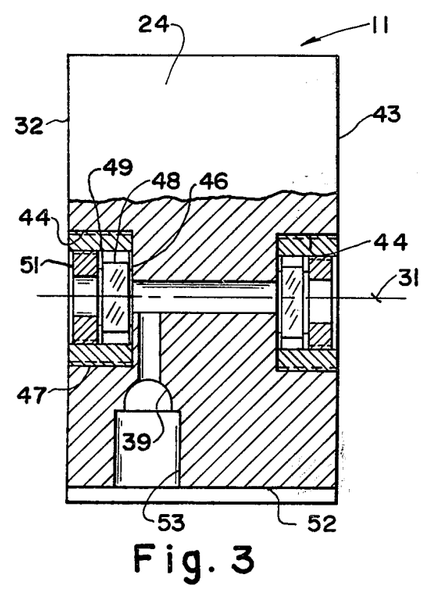
FIG. 3 is a sectional view along the line 3—3 of FIG. 1.

Referring now to FIG. 3 a sectional view of the integrated flow path block 11 is shown revealing the sealed optical path 31. Optical path 31 encloses a volume corresponding to a stopped flow volume. Block body 24 has a front face 32 and a rear face 43. Front and rear faces 32 and 43 respectively are both in communication with optical path 31. Faces 32 and 43 have threaded bores 44 extending into the block body 24. The assemblies contained in bores 44 are identical. A first compliant washer 46 is located in the bottom of bore 44 having a hole centrally disposed therein. A hollow cylindrical insert 47 having internal and external threads with the external threads mating with the threads of threaded bore 44 is advanced to the bottom of bore 44. A window 48 is placed within the hollow threaded insert 47 overlying the first compliant washer 46. A second compliant washer 49 having a centrally disposed hole therethrough is placed within insert 47 overlying window 48. A hollow cylindrical window retainer 51 having external threads mating with the internal threads in hollow threaded insert 47 is advanced within insert 47 to achieve firm contact with the second compliant washer 49. The bottom of block body 24 has a groove 52 extending from the front face 32 to the rear face 43. Block body 24 has a mixer insert bore 53 extending upward from bottom groove 52 and communicating with mixing chamber 39.

Figure 4:
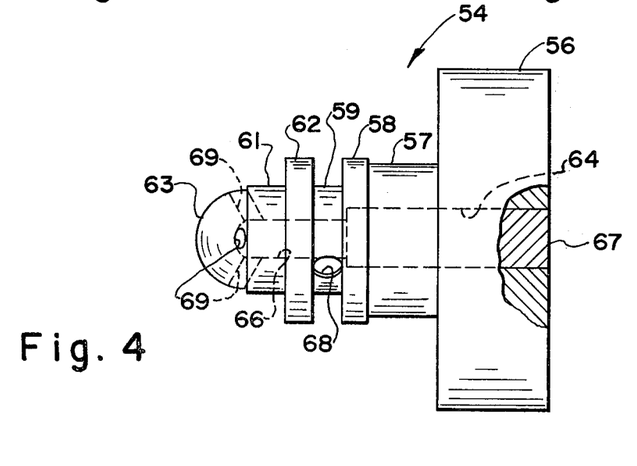
FIG. 4 is a side elevational view showing the complex mixer detail.

Referring to FIG. 4 the details of a complex mixer 54 are shown. The mixing principles of the mixer 54 are described in the article "High Resolution Mixer for the Study of the Kinetics of Rapid Reactions in Solution" from The Review of Scientific Instruments, Volume 39, No. 4. April 1968, by Robert L. Berger et al. The mixer described therein is more complex than that in the instant disclosure, but the mixing chamber 39 is of the form described by Berger. The complex mixer 54 has a lower base flange 56 and a mixer body 57 extending thereabove. Mixer body 57 has a lower sealing land 58 around the top portion of the mixer body 57. A first cylindrical collar 59 is located above the lower sealing land 58. A second cylindrical collar 61 is located above the first cylindrical collar 59 and an upper sealing land 62 provides means for blocking flow between the first and second cylindrical collars 59 and 61 respectively. A hemisphere 63 is formed above the second cylindrical collar 61.

Complex mixer 54 has a central bore with a larger diameter 64 reaching to the height of the lower end of lower sealing land 58, and a smaller diameter 66 extending further inside hemisphere 63. A plug 67 having an outside diameter matching bore 64 is inserted therein having a length completely filling bore 64 and seating so that the plug end is flush with the bottom of mixer base flange 56. First cylindrical collar 59 has a through radial hole 68 in communication with smaller bore 66. Hemisphere 63 has a plurality of radial holes 69, four in the embodiment shown, also in communication with bore 66.

Turning now to FIG. 5 the operation of the embodiment disclosed above will be described. Syringe barrels 26 containing reactants are inserted into cavities 34 having their bottom openings extending into the standard Luer taper bores 37 placing the reactants in communication with inlet paths 38. The conical bottom or countersink 36 guides the small diameter tip on the syringe body 26 into the bores 37. Syringe pistons 27 when simultaneously moved in a downward direction causes reactants to flow from the syringe barrels 26 through the inlet paths 38 to the mixer 54. Inlet path 38a communicates with first cylindrical collar 59 forcing reactant from inlet path 38a through hole 68, into bore 66, and through holes 69 outwardly into mixing chamber 39. Reactant flowing from syringe barrel 26 through inlet path 38 is directed against second cylindrical collar 61, flowing thereabout and also continuing into mixing chamber 39. The two reactants in this embodiment are joined in the space between the hemisphere 63 and the walls of mixing chamber 39, and experience considerable turbulence immediately downstream of hemisphere 63. Mixing occurs in the area of turbulence, and the mixed reactants proceed through passage 41 into the optical path 31. When the force is removed which simultaneously depresses syringe pistons 27, the motion of pistons 27 stops substantially immediately. Flow through the block body 24 thereby stops substantially instantaneously. Observations may now be made through the optical path 31 which contains a stopped flow volume for observations of the kinetics of reaction rates in the mixed solution of reactants.

Figure 3A:
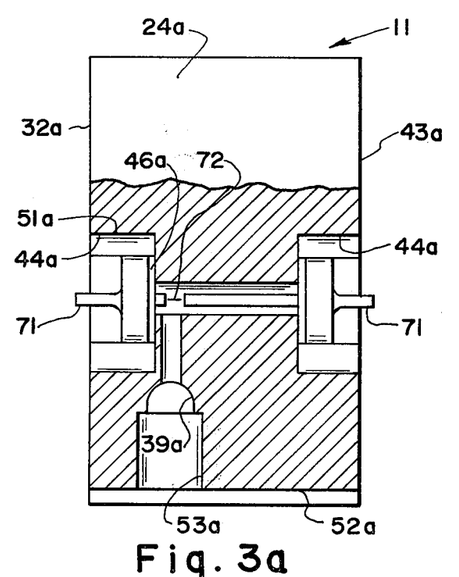
FIG. 3a is an additional sectional view along the line 3—3 of FIG. 1.

Referring now to FIG. 3a a sectional view of a configuration is shown similar to that of FIG. 3. Similar parts are shown with the suffix letter $a$ affixed. In this embodiment electrodes 71 are disposed at each end of a measuring path 72 for measuring the electrical conductance of the mixed reactants which are caused to flow into conducting path 72 in the same manner as that described above for causing reactants to flow into optical path 31. In the embodiment shown in FIG. 5 and the modification shown in FIG. 3a the reactants contained in optical path 31 and conducting path 72 respectively are caused to exit through efflux path 42 of FIG. 2 by the ensuing volume of reactants caused to flow through block body 24 and 24a respectively by subsequent downward motions of syringe pistons 27.

Figure 6:
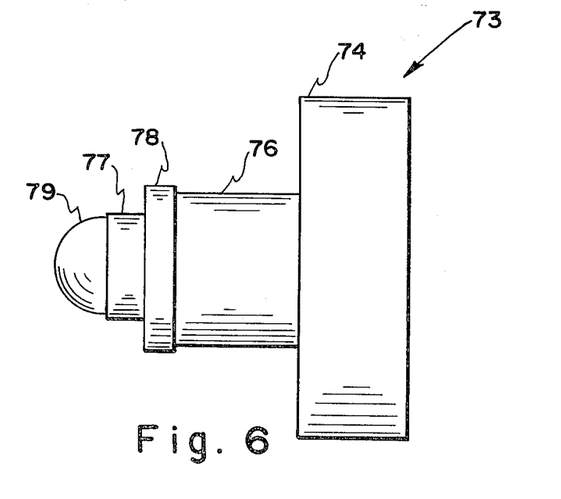
FIG. 6 is a side elevational view showing the simple mixer detail.

Turning now to FIG. 6 the description of a simple mixer 73 follows. A mixer base flange 74 is located at the bottom of simple mixer 73 having a mixer body 76 extending thereabove. A cylindrical collar 77 is formed above mixer body 76 having a sealing land 78 disposed therebetween. A hemisphere 79 is formed above cylindrical collar 77.

Referring now to FIG. 5a a block body 81 for use with the simple mixer 73 is shown. Syringe pistons 27 are inserted in syringe barrels 26 which in turn are inserted in cavities 34 having countersunk bottoms 36 and standard Luer taper bores 37 as in FIG. 5 above. Optical path 31 is in communication with passage 41 which extends from mixing chamber 39 forming a portion of a flow conduit identical to that described in FIG. 5 above. Inlet paths 82 and 82a in FIG. 5a both lead from the bottom of the standard Luer taper 37 to the mixing chamber 39. Mixer insert bore 53 receives simple mixer 73 and inlet paths 82 and 82a are positioned to discharge reactants from their respective syringe barrels 26 to impinge on opposite sides of cylindrical collar 77. Flowing reactants continue into the space between hemisphere 79 on simple mixer 73 and the walls of mixing chamber 39. Considerable turbulence is generated downstream of hemisphere 79. The mixed reactants flow through passage 41 to optical path 31 where they are available for measurement when the flow is stopped.

FIG. 5a may also incorporate the modification of FIG. 3a involving electrodes 71 and conducting path 72 in lieu of optical path 31 in the same manner as described for the embodiment depicted in FIG. 5 above. It should also be noted that efflux path 42 as shown in FIG. 2 exists in the embodiment of FIG. 5a for discharge of the volume of mixed reactants contained in optical path 31 or conducting path 72 upon subsequent flow through block body 81 caused by further downward motion of syringe pistons 27. By way of example both complex mixer 54 and simple mixer 73 may be made of a relatively soft material such as polytetrafluoroethylene.

Figure 7:
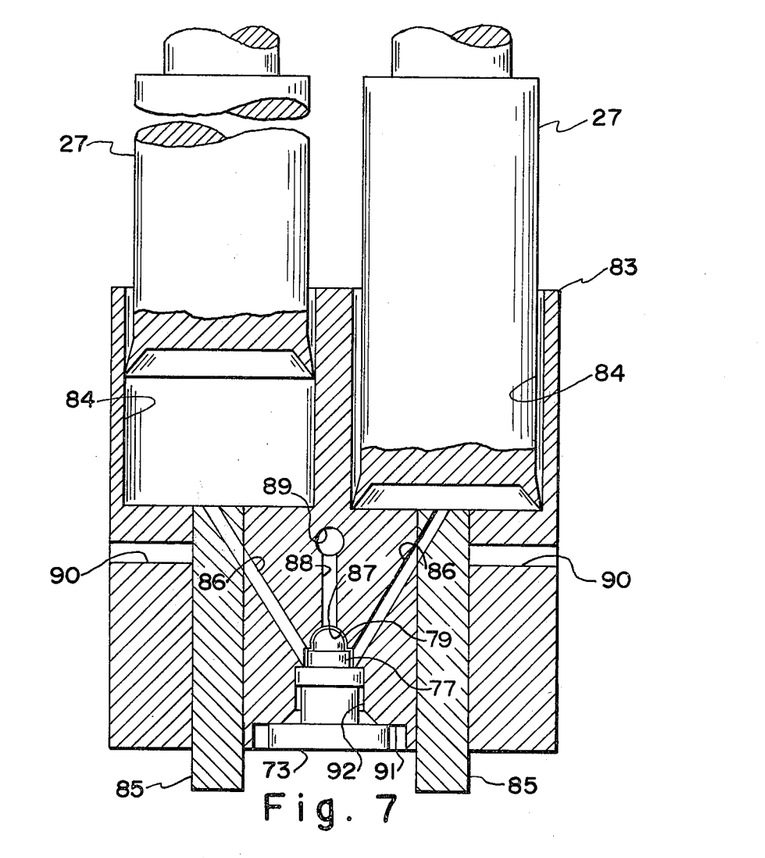
FIG. 7 is an additional sectional view along the line 5—5 of FIG. 2 showing an additional embodiment of the integrated flow path block.

Referring now to FIG. 7 a block body 83 is shown having cavities 84 formed therein to accept syringe pistons 27. Inlet paths 86 are shown communicating one one end with a mixing chamber 87. A pair of paths 90 extend inwardly from the exterior of block 83. First and second valves 85 are disposed to select paths 86 or 90 for communication with cavity 84. Passage 88 is in communication with mixing chamber 87 and leads to optical path 89. Block body 83 has a groove 91 from the front face to the rear face and a mixer insert bore 92 extending from the groove 91 communicating with the mixing chamber 87. Simple mixer 73 is shown in mixer insert bore 92 in this embodiment.

The operation of the integral flow path shown in FIG. 7 involves depositing reactants into cavities 84 which serve as containers in block body 83. Deposition of reactants into cavities 84 involves turning valves 85 to place paths 90 in communication with cavities 84 and injecting the reactants therethrough. After filling cavities 84 valves 85 are repositioned to place paths 86 in communication with the container reactants in cavities 84. Syringe pistons 27 are positioned in cavities 84 above the reactants contained therein, causing reactants to flow through inlet paths 86 when they travel through a downward stroke. Reactants emerge from inlet paths 86 to impinge upon cylindrical collar 77, flowing together in the space formed between hemisphere 79 and the walls of mixing chamber 87, thereby mixing as a result of the turbulence immediately downstream of hemisphere 79 as described before. Flow continues through passage 88 into optical path 89 providing a fresh charge of thoroughly mixed reactants for observation. The reactant mixture occupying optical path 89 prior to a downward stroke of syringe pistons 27 is discharged through an efflux passage (not shown) similar to that at 42 in FIG. 2.

It should be understood that complex mixer 54 could be used in mixer insert bore if inlet paths 86 were directed one to first cylindrical collar 59 and another to second cylindrical collar 61. It should also be noted that optical path 89 could be replaced by a conducting path similar to 72 and electrodes 71 in FIG. 3a.

Figure 8:
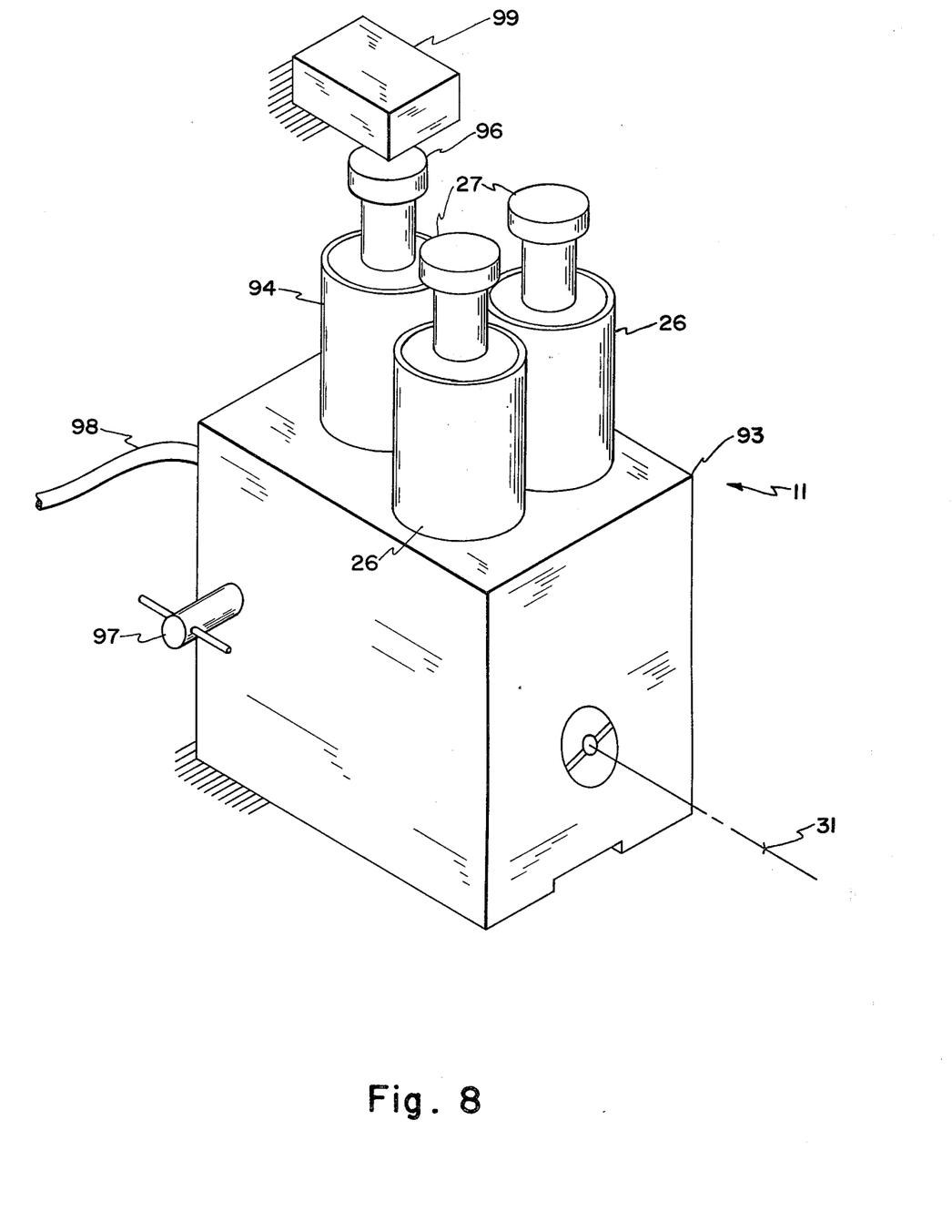
FIG. 8 is a perspective view of another embodiment of the integrated flow path block.

Another embodiment of the present invention is shown in FIG. 8. Syringe bodies 26 having syringe pistons 27 disposed therein are placed in a block body 93. A third cavity (not shown) is formed in body 93 to accept a third syringe body 94 having a third syringe piston 96 disposed therein. The efflux passage similar to that at 42 is directed from optical path 31 as in FIG. 2 to a third valve 97. An efflux tube 98 is also directed to valve 97. Valve 97 places either efflux tube 98 or the efflux passage similar to that at 42 in communication with the third cavity (not shown) which is in communication with syringe body 93. A stop 99 is disposed for contact with syringe piston 96.

The embodiment of FIG. 8 operates as follows. Syringe body 94 is initially empty and syringe piston 96 is bottomed out. Syringe bodies 26 initially have reactants contained. The system is initially full of reactant mixture. Valve 97 is turned to place the third syringe body 94 in communication with the efflux passage similar to that at 42 in FIG. 2. A driving force simultaneously depresses the syringe pistons 27. Reactant mixture is forced into the channels of flow path block 11 as described above. Reactant is displaced into syringe 94, termed a "stop syringe" raising piston 96 until it contacts stop 99 creating a hydraulic lock. Pistons 27 may be moved no further due to the hydraulic lock and a measured charge of mixed reactants is available for observation in block 11. Subsequent to an observation, valve 97 is turned to place syringe in communication with efflux tube 98. Syringe piston 96 is depressed fully in syringe body 94 discharging its contents through tube 98. Valve 97 is repositioned to place syringe body 94 in communication with the efflux passage similar to that at 42 in FIG. 2. The system is now ready for another driving stroke at pistons 27.

The embodiments described above all display reactant storage, flow, observation and efflux within a minimal volume. This feature substantially eliminates thermal gradients within the reactants. There are minimum length flow paths involved. This provides low flow impedance and minimum sample quantity or hold-up volume. There is less flushing volume required. This is an important consideration since many reactants are in the form of small hard to get quantities. The embodiment using a stop syringe further reduces flow path length and dead time for a given driving force.

It is apparent that an integrated flow path block has been provided which in one embodiment has no need for a stop syringe, a drain valve, or syringe filling valves. Another embodiment may use a fill valve. Yet another embodiment may use a fill valve, stop syringe and drain valve. The flow path block embodiments described herein are of minimal volume and include integral containers for a plurality of reactants, a mixer of the "ball" type providing rapid thorough mixing, and a chamber for determining a physical characteristic of the mixture. In the event a measured volume of mixed reactants is desired without a measurement of a physical characteristic of the mixture, the mixed reactants are simply collected for their intended subsequent use at the downstream end of an efflux passage. In the event optical measurement of the mixed reactants is desired proper light seals are provided at front and rear faces of the block body.

I claim:

1. An integrated flow path block for mixing a plurality of reactants, comprising a block body, a plurality of wells integral with said block body for separately storing the reactants, a syringe piston for cooperation with each of said plurality of wells, said block body having a plurality of short reactant paths therein, one reactant path communicating with each one of said plurality of wells, said block body further having a plurality of internal walls defining a chamber proximate to said plurality of wells and in communication with said short reactant paths, said chamber having a substantially hemispheric wall at one end and a right circular cylindrical wall at the other, said chamber having a plurality of openings in said cylindrical walls, said openings being in communication with said plurality of short reactant paths, a mixer for insertion into said chamber in spaced relation with said internal walls of said chamber, said mixer comprising a cylindrical body configured to fit within said cylindrical walls, a first cylindrical collar on said cylindrical body disposed in communication with a first one of said openings, a second cylindrical collar disposed in communication with a second one of said openings, means for blocking flow between said first and second collars, a hemisphere attached to said first cylindrical collar extending into said one end of said chamber and spaced therefrom, said second cylindrical collar having a channel extending from the exterior of said second cylindrical collar to the interior of said hemisphere, and said hemisphere having a plurality of holes extending therethrough in communication with said chamber, whereby reactants introduced through said first and second ones of said openings flow into the space between said hemispheric wall of said chamber and said hemisphere, and are thereby mixed immediately downstream of said hemisphere due to the flow turbulance, and reactant outlet means within said block body leading from said chamber, whereby reactants in minimum volume are completely mixed and delivered to said reactant outlet means in minimum time after said syringe pistons are depressed.

2. An integrated flow path block for mixing a plurality of reactants and presenting said mixer for analysis within a minimum volume, comprising a unitary block body, said block body having a plurality of reservoirs formed therein for separately storing the reactants, means forming a plurality of short reactant paths communicating with each of said plurality of reservoirs, said block body having a chamber in communication with said plurality of short reactant paths, said one end of said chamber being hemispheric and said chamber being cylindrical on the other end, a mixer insert formed to be received in said chamber, a first cylindrical collar formed on said mixer insert for disposition in said other end of said chamber opposite a first one of said means forming a plurality of short reactant paths, a second cylindrical collar formed on said mixer insert for disposition in said other end of said chamber opposite a second one of said means forming a plurality of short reactant paths, means blocking flow between said first and second collars, said mixer insert one end surface being a hemisphere formed adjacent to said first cylindrical collar and surrounded by and spaced from said hemispheric one end of said chamber, said second cylindrical collar having a channel extending from the exterior thereof to the interior of said mixer insert hemisphere, said mixer insert hemisphere having a plurality of holes extending therethrough in communication with said channel, whereby reactants introduced through said first and second ones of said plurality of short reactant paths flow into said one end of said chamber, and are mixed immediately downstream of said hemisphere solely due to flow turbulence, a syringe piston positioned in each of said reservoirs, whereby advancing said syringe piston delivers reactant from a respective reservoir to said chamber, cell means in communication with said chamber for receiving and retaining a predetermined volume of mixed reactants so that reaction characteristics may be measured therein, and means for carrying a reactant efflux in communication with said cell means, whereby said predetermined volume, thermal gradients therein, and flow impedance thereto are minimized.

3. An integrated flow path block as in claim 2 wherein said unitary block body has front and rear faces thereon, said cell means therethrough extending between said front and rear faces, optical windows at each end of said optical path, means for sealing said optical windows at said front and rear faces, said front and rear faces providing a light seal for barring ambient light from said optical path whereby reactant characteristics may be measured optically.

4. An integrated flow path block as in claim 2 wherein said cell means comprises a flow path section having electrically nonconductive walls and electrodes in communication with opposite ends of said flow path section whereby reactant characteristics may be measured electrically.

5. An integrated flow path block for mixing a plurality of reactants, comprising a block body, a plurality of wells integral with said block body for separately storing the reactants, a syringe piston for cooperation with each of said plurality of wells, said block body having a plurality of short reactant paths therein, one reactant path communicating with each one of said plurality of wells, said block body further having a plurality of internal walls defining a chamber proximate to said plurality of wells and in communication with said short reactant paths, said chamber having a substantially hemispheric wall formed at one end thereof and a right circular cylindrical wall at the other, said chamber further having a plurality of openings in said cylindrical wall in communication with said plurality of short reactant paths, a mixer for insertion into said chamber in spaced relation with said internal walls of said chamber, said mixer comprising a cylindrical body configured to fit within said cylindrical wall, a cylindrical collar disposed on said cylindrical body in communication with said plurality of openings, a hemisphere attached to said collar positioned within said one end of said chamber and spaced therefrom, whereby reactants flowing through said plurality of short reactant paths impinge on said cylindrical collar and flow around said hemisphere and through said one end of said chamber, thereby becoming thoroughly mixed due to turbulence immediately downstream of said hemisphere and reactant outlet means within said block body leading from said chamber, whereby reactants in minimum volume are completely mixed and delivered to said reactant outlet means in minimum time after said syringe pistons are depressed.

6. An integrated flow path block as in claim 5 wherein each well of said plurality of wells has a tapered bore formed in the bottom thereof, said block body being of unitary construction, and a plurality of syringe bodies for fitting in said plurality of wells for receiving said syringe pistons, each syringe body having one end formed to fit in each of said tapered bores, said one end having an opening in communication with one of said plurality of short reactant paths.

7. The integrated flow path block as in claim 5 further comprising means for providing reactants to said wells, said means for providing reactants to said wells comprising a plurality of reactant supply paths extending from the exterior of said block body to each of said wells, said means further comprising a plurality of valve means in said block body for alternately communicating each of said wells with one of said reactant supply paths and with one of said plurality of short reactant paths, whereby fresh reactant supply may be directed through ones of said reactant supply paths to said wells without removing said syringe pistons or to said mixer through said short reactant paths.

8. An integrated flow path block as in claim 5 wherein said reactant outlet means includes means for retaining a predetermined volume of mixed reactants received from said chamber, an additional well in said block body for receiving said mixed reactants from said means for retaining a predetermined volume, an additional syringe piston adapted to fit in said additional well, a stop spaced from said additional syringe piston for limiting the outward travel thereof, an efflux tube leading from said block body, and valve means for selectively communicating said additional well with said efflux tube and said means for retaining a predetermined volume of mixed reactants, said additional syringe piston and stop operating to limit flow quantity through the integrated flow path block, as determined by said stop, to said predetermined volume when said valve means communicates said additional well with said means for retaining mixed reactants.

9. An integrated flow path block as in claim 5 wherein said reactant outlet means includes means for retaining a predetermined volume of mixed reactants received from said chamber and efflux means communicating with said means for retaining reactants.

10. An integrated flow path block as in claim 9 wherein said means for retaining a predetermined volume comprises a sealed optical path, and front and rear faces on said block body through which said optical path extends, said faces providing a light seal for barring ambient light from said optical path, said predetermined volume corresponding to a stopped flow volume for the observation of reaction rates within said mixed reactants.

11. An integrated flow path block as in claim 9 wherein said means for retaining a predetermined volume comprises a sealed flow path section having electrically nonconductive walls, and electrodes in communication with the ends of said sealed flow path section, said predetermined volume corresponding to a stopped flow volume for electrical measurement of reaction rates within said mixed reactants.

* * * * *